May 16, 1961 H. PEDERSON 2,984,029
DETACHABLE ROOT CLEARING TEETH FOR SMALL BULLDOZERS
Filed Sept. 22, 1958 2 Sheets-Sheet 1

HENRY PEDERSON
*INVENTOR.*

BY
*Smith & Tuck*

May 16, 1961   H. PEDERSON   2,984,029
DETACHABLE ROOT CLEARING TEETH FOR SMALL BULLDOZERS
Filed Sept. 22, 1958   2 Sheets-Sheet 2

HENRY PEDERSON
INVENTOR.

BY
Smith & Tuck

United States Patent Office 2,984,029
Patented May 16, 1961

2,984,029

DETACHABLE ROOT CLEARING TEETH FOR SMALL BULLDOZERS

Henry Pederson, P.O. Box 89, Bellingham, Wash.

Filed Sept. 22, 1958, Ser. No. 762,613

6 Claims. (Cl. 37—145)

This present invention relates to the general field of bulldozer auxiliary equipment and more particularly to teeth that are intended for use in a group attached to the front face of the moldboard preferably of the smaller and medium type of tractors such as are used by farmers, who till relatively small areas. Means are provided for convenient removal or adjustment of the depth of the root seeking teeth and resilient means is provided for mounting the same in place so that the relatively light teeth will not be destroyed by bending or breaking if a solidly secured root or heavy rock is encountered.

In the past it has been common to go through the major operation of clearing prospective farm lands of the native growth of trees by blasting, pulling or pushing the remaining stubs out of the ground. Such clearing, while it removes the bulk of the tree growth, of necessity leaves in the ground all the various branch shoots of the main roots, which tend to grow and if left alone will eventually produce new young trees. It has been common to use such land for pasturage and other surface purposes because of the extreme difficulty experienced in endeavoring to till the soil as by plowing, harrowing and the like, due to the fact that there were such a mass of hidden roots. The customary plan was to use the land in a more or less haphazard manner until this root structure largely disintegrated through rotting. This time lag has been one of the deterrents in bringing logged off land into tillable farm land, which can take the full range of crop planting and tilling. Logged off land, however, is the best supply of land for the small individual farmer and it is for this reason that I have provided my easily removable and resiliently positioned root clearing teeth for small bulldozers.

The principal object of my invention, therefore, is to provide a plurality of small bulldozer teeth that are light in weight and easily handled and are provided with means for conveniently securing them to the front face of the average bulldozer blade.

A further object of my invention is to provide a plurality of removable bulldozer teeth, which are provided with convenient and quickly operated means for varying the depth to which the bulldozer teeth may be extended below the cutting blade of the bulldozer blade.

A further object of this invention is to provide means for cushioning or resiliently mounting these relatively lightweight teeth so that they will not be easily damaged beyond continued usefulness and to this end rubber mounting devices are provided for the upper and lower portions of the bulldozer teeth.

A further object of this present invention is to provide a plurality of movable teeth for a bulldozer blade which are provided with forward extension portions near the lower end of the teeth so that they will tend to secure roots that have been dug out of the ground and carry them along until they have been well removed from the ground.

Further objects, advantages and capabilities will be apparent from the description and disclosure in the drawings, or may be comprehended or are inherent in the device.

Figure 4:
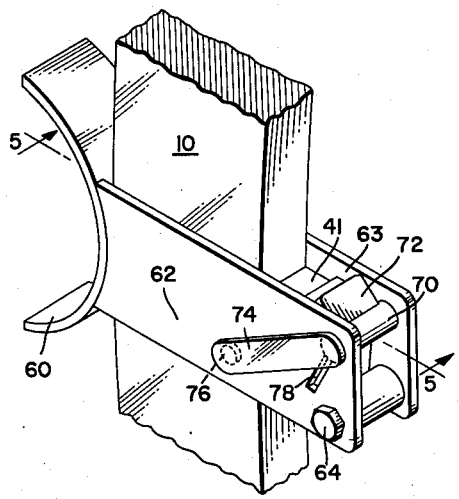
Figure 4 is a perspective view illustrating the top bracket mounting arrangement and rubber wedge holding means in its relationship to a tooth, which is shown as broken away and sectioned for convenience of illustration.
Figure 5:
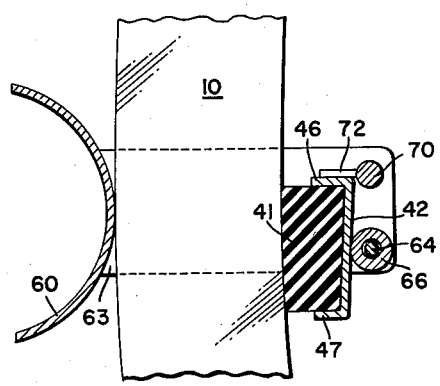
Figure 5 is a vertical sectional view taken along the line 5—5 of Figure 4 and showing the manner in which the rubber wedge is employed.

Referring to the drawings, throughout which like reference characters indicate like parts, 10 designates the main body of a tooth. This, as will be noted from Figure 4, is preferably rectangularly shaped with a depth of approximately three times the width of the tooth as a satisfactory proportioning. The tooth itself should be made of material that will give a degree of resiliency by having an alloy or tempering that will produce a tooth of spring-like type so that it will twist or bend an appreciable amount but will actually break before it passes its elastic limit. This characteristic is very desirable in any arrangement of this order where a plurality of teeth are being used as a unit and must be kept in alignment.

Each end of the tooth is formed to assist in the root clearing operation. The lower ends as they are arranged in the drawings are provided with a forward extension 12 which produces a root carrying portion 14. At their upper end as illustrated, the teeth are provided with more pronounced arcuate rest portions 15, which are adapted to serve as safety hooks to catch and hold branches and the like that might spring back and hit the driver. A branch directing portion 16 is provided having a bevelled face to direct the branches into the circular portion 15. The rest 15 is backed up by the curved tooth potrion 18 of gradually increasing thickness at it approaches the main body 10.

Figure 1:
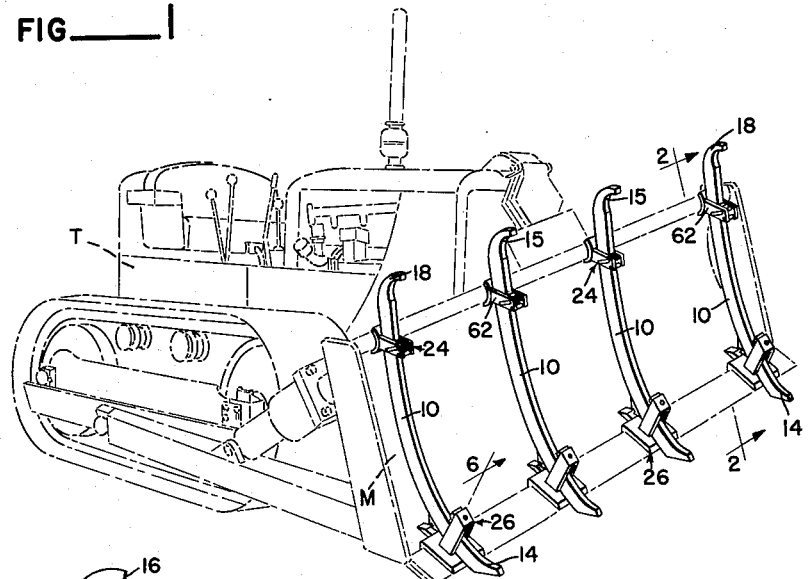
Figure 1 is a perspective view illustrating a group of my bulldozer teeth in their operational position and showing in dashed lines a bulldozer of the track laying type.
Figure 2:
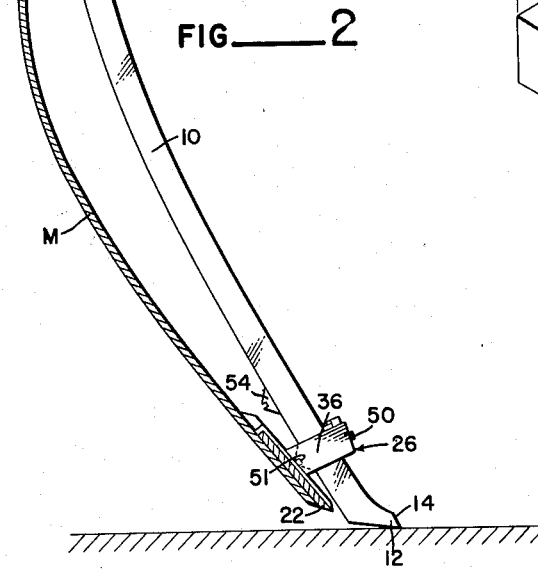
Figure 2 is a cross sectional view, in elevation, taken along the line 2—2 of Figure 1 and illustrating the relationship between my teeth and the bulldozer blade.

Tooth 10 is supported in its operational position by the conventional moldboard or blade M such as is used on various types of farm tractors. In Figure 1 a tractor T of the crawler type has been illustrated. However, for use on the smaller farms it has been found that even the wheel type tractor that has greater utility can be used in this same general manner as they are normally provided, as an optional attachment, with moldboards and means for handling the same and have adequate power for this present root clearing operation. One desirable arrangement is that the tooth is held firmly in its operational position and then may be raised by the expedient of raising the blade by any of the various conventional types of lift mechanisms used for this purpose. In Figure 2 a type of moldboard quite common on the smaller type of tractors is illustrated and this usually has a rolled stiffening portioning at 20 and is provided at its lower end with a replaceable (usually high carbon steel), cutting edge 22. In certain operations, it is quite common to employ this cutting edge in association with my root clearing teeth as in cutting long roots that are best removed in sections.

I provide attachment brackets as 24 at the upper side of the moldboard and at 26 near the cutting face. These brackets may be variously secured to the blade. However, they are normally relatively small and a most convenient means is to tack weld the same to the blade itself or in the case of the lower unit to secure them to the shrouding member 30, which is normally employed to secure the cutting edge 22 in position on the blade M. This construction, which is more common to the small tractors is illustrated in Figure 6.

Figure 6:
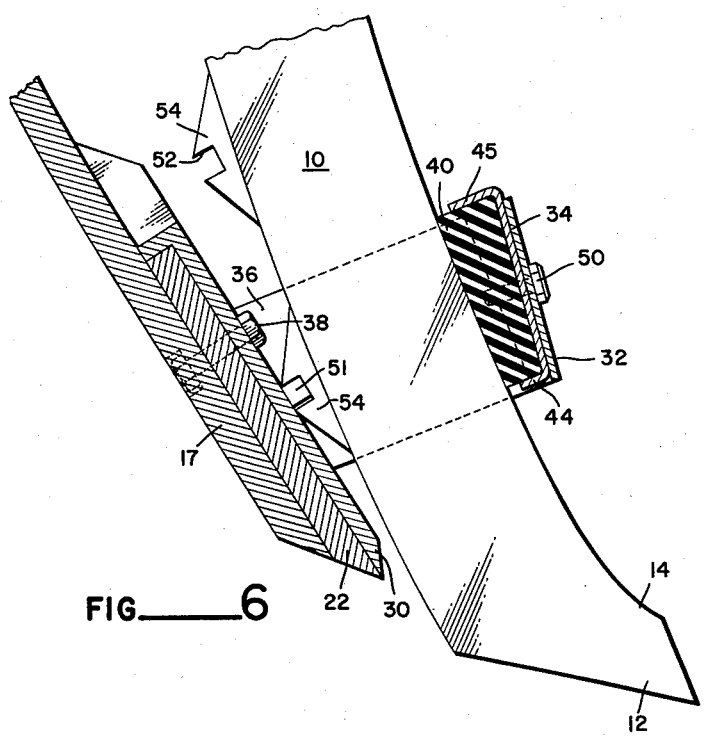
Figure 6 is a fragmentary vertical sectional view as taken along the edge of the tooth of Figure 2 and showing only the lower portion thereof.

The lower brackets, which are quite well illustrated in Figures 1, 2 and 6 consist of a U-shaped stirrup arrangement 32 having the end portion 34 and two side portions 36, which usually are welded either to the lower portion of the blade or more commonly as illustrated in Figures 2 and 6 to the shrouding member 30, which shrouding member is in turn secured to the moldboard by a plurality of bolts 38. The outer wall 34 is disposed sufficiently in front of tooth portion 10 so that a resilient rubber wedge 40 may be disposed between end 34 and the front face of tooth 10.

Figure 3:
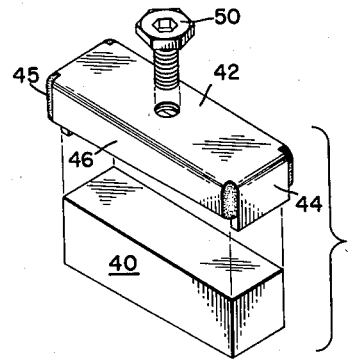
Figure 3 is an isometric view, in exploded relationship, illustrating one of the rubber wedge units as used at the upper and lower ends of my bulldozer teeth and showing the sheet metal shroud that is employed to assist in positioning the same.

The resilient wedge members are very similar in their construction and this is possibly best illustrated in Figure 3 in which a block of rubber 40 is provided having a rectangular transverse section but being tapered from one end to the other as illustrated in Figure 3 and Figure 6.

The rubber is partially enclosed by the wedge shrouding member 42. This is preferably made with right angle bends to provide the end support portions as 44 and 45. On the sides, downwardly bent portions provide side engaging plates 46 and 47. These side engaging portions of shroud 42 should not extend entirely across the surfaces they engage because the prime reason for using rubber in this arrangement is to provide a resilient securing means for teeth 10 and, as rubber is generally considered as noncompressible, space must be left for the distortion or flowing of the rubber under compression loading. End plates 44 and 45, however, provide a convenient means of tapping the wedges into their final position or when the disassembly of the unit is contemplated tapping as on surface 44 to remove the wedge. The lower wedge, illustrated particularly in Figure 3 is held in its operational position by means of a cap screw or set screw arrangement 50. This is preferably threaded into end plate 34 of bracket member 32 and when the same is screwed in position as shown in Figure 6, it holds the wedge very securely in position.

Fixedly secured, as by welding thereto, and in fixed relationship to stirrup member 32 is a key 51. This key coacts with a plurality of keyways 52 formed in lugs 54 of which several may be attached to tooth 10. These lugs with their keyways coacting with key member 51 provide positive location vertically for teeth 10. The preferred form of lugs 54 is that shown in Figure 6 so as to provide flexing of tooth 10 under use, to a limited degree. This need for flexure is of course one of the reasons for employing the rubber wedge 40 at this position. It has actually two purposes; it restores the parts after flexure and it provides an easy means of adjusting tooth 10 for depth, it being only necessary to remove the locking screw 50 and then to tap wedge 40 with its shrouding 42 upwardly and out of its retaining socket, which is provided by stirrup member 32. The removal of the rubber wedge will of course provide adequate clearance so that the tooth may be adjusted to another one of lugs 54 and then the wedge restored to its operational position.

Figure 7:
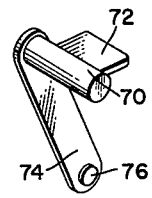
Figure 7 is a perspective view illustrating a locking means employed to secure the upper rubber wedges in position.

At the upper edge of the moldboard, it is necessary to provide a, secured in place, bracket for each of the working teeth 10. One satisfactory solution is illustrated throughout the drawings in which a base plate 60 is provided of a configuration to conform to the upper reinforcing bar 20 of the blade M. Secured to plate 60 are spaced stirrup side members 62 and 63. These are preferably secured together at their outer limits by a through bolt 64 and to assist in moving and positioning the upper rubber wedge 40 this bolt is preferably provided with a surrounding steel bushing 66. Bolt 64 is normally made of mild steel and in association with bushing 66 provides a shear pin to relieve any unusual loading of teeth 10. Also disposed between the two ends of plates 62 and 63 is the wedge retaining member, probably best illustrated in Figure 7. This consists of a shaft 70, a positioning and securing blade 72 adapted to engage the rubber wedge when driven into its position of use, and a locking bar 74. Bar 74 is provided with an inwardly directed detent 76 and this detent is adapted for positioning in a coacting hole formed in side plate 62 and thus completing a locking arrangement for the upper wedge 40. As a convenience in the assembly of the unit, a slot is provided at 78 inside plate 62 so that by turning the keeper member 72 to the proper position it can be withdrawn through slot 78 together with shaft 70. This is a convenience in removing wedge 40 as in the adjustment or removal of teeth 10.

*Method of operation*

In the operation of equipment of this order, the equipment must be capable of a reasonable range of adjustment in order to meet the widely varying conditions encountered. This present equipment has proven to be very effective in that the various teeth 10 are easily and accurately adjustable with respect to the lower edge of the bulldozer blade 22 and this makes it possible to use the teeth to loosen up roots and cut the same into convenient lengths. There are many of our quick growing soft wood trees and hardy berry bushes and the like that have quite elaborate root systems that extend for considerable distance under the surface. These roots are relatively small in size and for that purpose the teeth can be extended so that relatively deep penetration is achieved and many times the same root may be engaged by two or more of the teeth. This is an ideal arrangement in that the root can then be eradicated completely. Ordinarily for this light type of root the mere hooked end as shown at 18 is most desirable. For the heavier roots coming particularly from the second growth trees the lower ends as shown in Figures 1, 2 and 6 is to be preferred in that it is easy for the operator of the bulldozer to disengage the teeth from the root in order that he may re-engage it more advantageously at another position in the length of the root. Under such conditions the slight hook 14 arrangement, shown in the lower portion of the noted views, has proven to be a very desirable shape.

In encountering a substantial root, the bottom of the teeth are held while the bulldozer tends to proceed. This places the bulk of the strain on key 51 and its coacting lug 54 and there is a tendency to pivot the tooth about this key. This action of course is resisted with very favorable mechanical advantage, by the upper bracket assembly and most particularly by the upper rubber-wedge 41. The upper wedge allows a reasonable resiliency of possibly approximately one-half inch of movement and it has been determined that this amount of movement together with the general resiliency of the tooth and the fact that the lower portion or point as 14 tends to move toward the moldboard gives about the maximum acceptable degree of resiliency. It is sufficient to prevent breakage of the teeth or induce severe shock upon the tractor mechanism itself. At the same time, it gives firmness to the engagement with the root and tends to break the root loose from its hold in the ground. This present arrangement has been very successful in the clearing of ground of roots and has proven much more satisfactory than where there is a large displacement of the tooth as by metallic spring suspension and the like.

When the farmer is through with his land clearing project, for a period at least, he can then remove the teeth and the positioning brackets will normally not be damaged by the normal use of the bulldozer nor will they interfere with the use of the bulldozer itself.

It is believed that it will be clearly apparent from the above description and the disclosure in the drawings that the invention comprehends a novel construction of detachable root clearing teeth for small bulldozers.

Having thus disclosed the invention, I claim:

1. An attachment for a farm type tractor having a vertically movable bulldozer blade; comprising: a plurality of teeth of rectangular cross-section constructed of resilient steel and having a length greater than the vertical extent of the bulldozer blade; a pair of coacting positioning and securing brackets for each tooth, consisting of an upper and a lower bracket, disposed in the same vertical plane and secured adjacent the horizontal margins of said bulldozer blade; said brackets having spaced side plates adapted to slidably engage the sides of said teeth and position them lengthwise of said bulldozer blade; keying means on the blade and on the teeth for vertically positioning the teeth, a rubber wedge means cooperating with said keying means to vertically position the teeth, and said rubber wedge means adjustably positions and resiliently maintains said teeth in said brackets with adequate clearance to permit the teeth to compress the rubber wedge and yield when meeting sudden loading.

2. The subject matter of claim 1 in which said means for vertically positioning said teeth, comprises: horizontally disposed keys secured adjacent the lower horizontal margin of said bulldozer blade and within the confines of said lower brackets and a plurality of outstanding lugs secured to the rear edge of each of said teeth, each having a horizontal keyway adapted to coact with said keys to position said teeth vertically.

3. The subject matter of claim 2 in which said means for resiliently maintaining said teeth in said brackets, comprises: wedge-shaped rubber blocks having metal shrouding partially enclosing them and adapted to be positioned in said brackets with the uncovered side of said wedges engaging the forward edge of said teeth; said shroudings overlap the ends of said wedge-shaped rubber blocks and provides impact surfaces permitting the driving of the wedges with a hammer to remove or seat said wedge blocks.

4. An attachment for a farm type tractor having a vertically movable bulldozer blade; comprising: a plurality of curved teeth of rectangular cross-section constructed of resilient steel and having a length greater than the vertical extent of the bulldozer blade; said teeth having lower end portions extending forwardly of said tooth bodies to provide root engaging and carrying means; said teeth having at their upper ends arcuate rest portions disposed to catch and hold small trees and branches that might spring back and hit the driver of the tractor; a pair of positioning and securing brackets for each tooth, disposed in the same vertical plane and secured adjacent the horizontal margins of said bulldozer blade; said brackets having spaced side plates adapted to slidably engage the broad sides of said teeth and position them longitudinally of said bulldozer blade; keying means on the blade and on the teeth for vertically positioning the teeth, a rubber wedge means cooperating with said keying means to vertically position the teeth, and said rubber wedge means adjustably positions and resiliently maintains said teeth in said brackets with adequate clearance to permit the teeth to compress the rubber wedge and yield when meeting sudden loading.

5. An attachment for a farm type tractor having a vertically movable bulldozer blade, comprising: a plurality of curved teeth, of rectangular cross-section, constructed of resilient steel and having a length greater than the vertical extent of the bulldozer blade; a pair of coacting positioning and securing brackets for each tooth, consisting of an upper bracket and a lower bracket, disposed in the same vertical plane and secured adjacent the horizontal margins of said bulldozer moldboard, said lower brackets having side plates and a joining end portion forward of said teeth and upper brackets having spaced side plates adapted to slidably engage the sides of said teeth and position them lengthwise of said bulldozer blade; a roller suporting bolt providing a joiner for each pair of upper bracket side plates; key means for vertically positioning said teeth; rubber wedges for resiliently maintaining said teeth in said brackets and a removable turn key locking means for securing the rubber wedges, one in each of said upper brackets.

6. An attachment for a farm type tractor having a vertically movable bulldozer blade, said attachment comprising in combination: a plurality of curved teeth of rectangular cross-section, constructed of resilient steel and having a length greater than the vertical extent of the bulldozer blade; a pair of coacting positioning and securing brackets for each tooth and consisting of an upper bracket and a lower bracket, said brackets disposed in the same vertical plane and secured to said bulldozer blade; said lower bracket having side plates and a joining end portion forward of said tooth, a rubber wedge between the tooth and the joining end portion to resiliently maintain said tooth in the bracket; said upper bracket having spaced side plates adapted to slidably engage the sides of said tooth, a roller supporting bolt providing a joiner for each pair of upper bracket side plates, a rubber wedge between said spaced side plates for resiliently maintaining said tooth in the upper bracket, a removable turn key locking means for securing the rubber wedge in the upper bracket; and a keying means for vertically positioning said tooth.

References Cited in the file of this patent

UNITED STATES PATENTS

| | | |
|---|---|---|
| 2,228,450 | Gaddis | Jan. 14, 1941 |
| 2,566,562 | Hale | Sept. 4, 1951 |
| 2,837,844 | Launder | June 10, 1958 |

FOREIGN PATENTS

| | | |
|---|---|---|
| 841,261 | France | July 28, 1939 |